E. W. DIETZ.
DIPPER TOOTH.
APPLICATION FILED FEB. 21, 1916.
1,218,841. Patented Mar. 13, 1917.
2 SHEETS—SHEET 2.
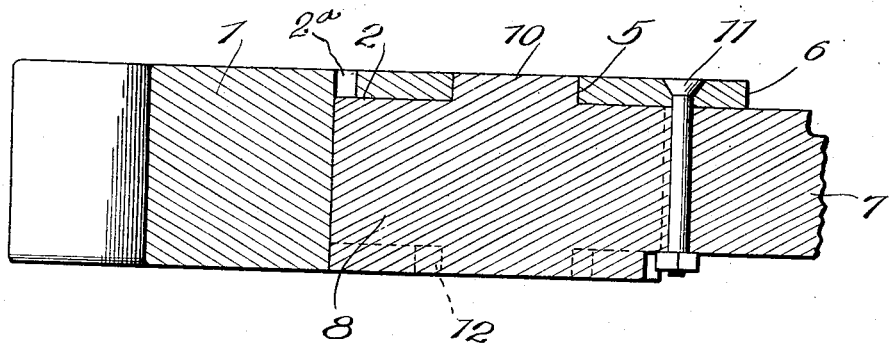
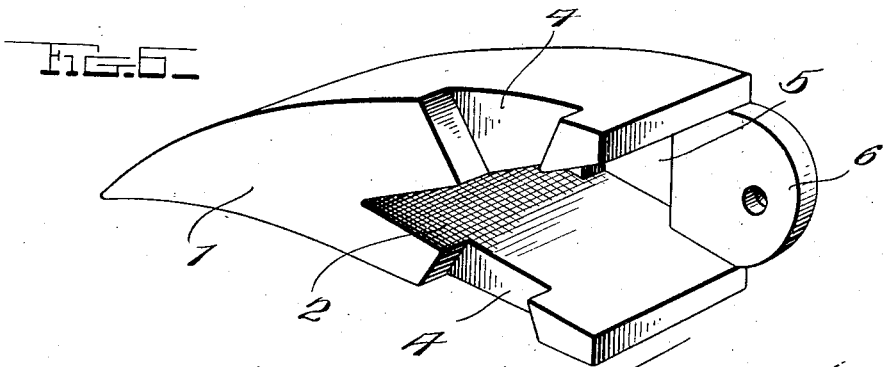
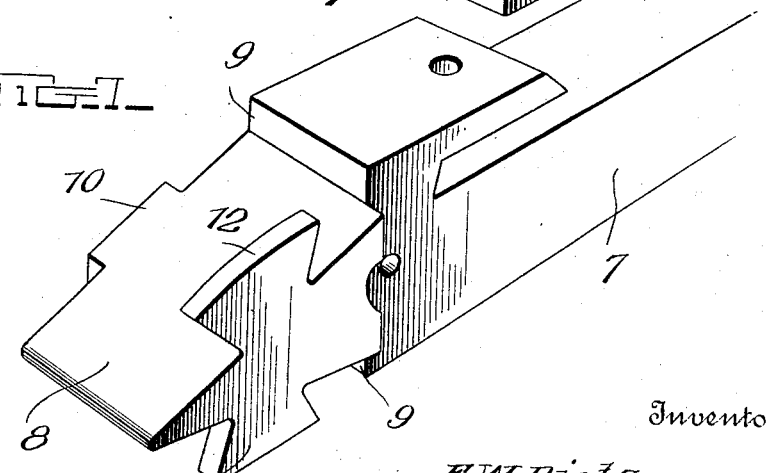
Witness
J. R. Pierce
Inventor
E. W. Dietz
by H. B. Willson & Co.
Attorneys

# UNITED STATES PATENT OFFICE.

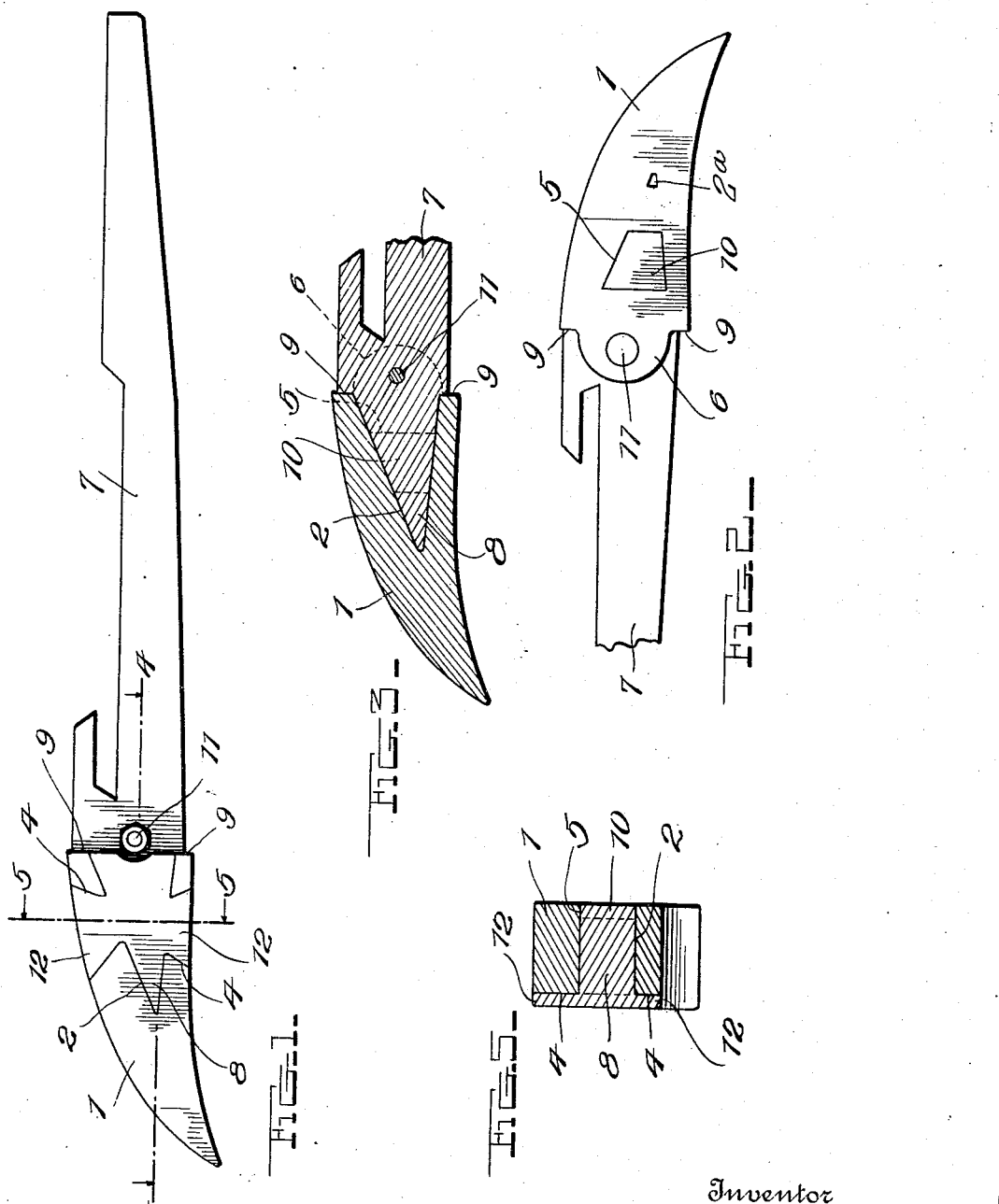

EDWIN W. DIETZ, OF AKRON, OHIO.

DIPPER-TOOTH.

1,218,841.

Specification of Letters Patent.

Patented Mar. 13, 1917.

Application filed February 21, 1916. Serial No. 79,674.

*To all whom it may concern:*

Be it known that I, EDWIN W. DIETZ, a citizen of the United States, residing at Akron, in the county of Summit and State of Ohio, have invented certain new and useful Improvements in Dipper-Teeth; and I do declare the following to be a full, clear, and exact description of the invention, such as will enable others skilled in the art to which it appertains to make and use the same.

My invention relates to improvements in dipper teeth and more particularly to detachable connections between the same and the attaching shanks thereof, the object of the invention being to provide a connection of this class which although being simple and inexpensive, will be highly efficient and durable.

With this general object in view, the invention resides in certain novel features of construction and unique combinations of parts to be hereinafter fully described and claimed, the descriptive matter being supplemented by the accompanying drawings which constitute a part of this application and in which:

Figures 1 and 2 are elevations of the opposite sides of the invention;

Fig. 3 is a longitudinal sectional view;

Fig. 4 is a horizontal sectional view taken on the plane of the line 4—4 of Fig. 1;

Fig. 5 is a vertical transverse section as seen on the plane of the line 5—5 of Fig. 1;

Fig. 6 is a perspective view of the tooth; and

Fig. 7 is a similar view of the attaching shank.

In specifically describing the construction shown in the drawings above briefly described, similar characters will be placed on corresponding parts throughout the several views and reference will be herein made to the numerous elements by their respective indices. To this end, the numeral 1 designates a tooth of the shape usually employed, said tooth having a V-shaped socket 2 whose outer end opens through the rear end of said tooth. As shown clearly in Fig. 5, one side of the socket opens through one side of the tooth, this side having cavities 4 which are preferably provided with flat bottoms and with inwardly converging sides, said cavities necessarily opening into the socket 2, and preferably opening through the upper and lower edges of the tooth as shown.

An angular recess 5 is formed in the side of the socket 2 opposite the open side thereof, said recess leading to the exterior of the tooth. The rear side of the aperture in question constitutes a forwardly facing stop shoulder to be hereinafter referred to. Immediately in rear of the aperture 5, an ear 6 is formed integrally with one side of the tooth 1, said ear extending rearwardly and being formed with an aperture to receive a fastening bolt which secures the tooth on the shank.

The attaching shank 7 which is secured on the shovel or dipper in any preferred manner, has its front end 8 shaped for snug reception in the cavity 2, said end being preferably shouldered at 9 adjacent its upper and lower edges to abut the rear end of the tooth 1. One side of the end 8 is provided with an integral lateral projection 10 received snugly in the recess 5, the rear edge of said projection constituting a stop shoulder coöperating with the shoulder above described to prevent the tooth 1 from moving forwardly from the shank until it is first moved laterally to such an extent as to disengage the two shoulders. Such movement, however, is normally prevented by a bolt 11 passing through the aforesaid shank and through the ear 6. The end 8, in addition to the projection 10, is provided with a pair of vertically extending wings 12 received within the cavities 4, this construction also assisting in properly holding the tooth on the shank. As shown, the two wings 12 and cavities 4 preferably decrease gradually in width from their outer to their inner ends.

It is to be observed that the rear ends of the wings 12 and the rear walls of the notches 4 abutting the same constitute shoulders which coöperate with those above described in preventing forward movement of the tooth 1 from the shank.

If, for any reason, it is necessary to detach a tooth 1 from its respective shank, it is simply necessary to remove the bolt 11, whereupon said tooth may be shifted laterally to disengage the wings 12 and the projection 10 from their respective retaining means, thus allowing said tooth to be pulled forwardly from the shank. Obviously, attachment of any tooth requires but a reversal of this operation.

In Figs. 2 and 4 an opening 2ª is shown leading from the socket 2 through the closed side thereof at the extreme inner end of said socket. This opening is to allow the socket to be thoroughly cleaned out after casting the tooth.

By constructing the device in the manner shown and described, it will be obvious that the same may be easily and inexpensively manufactured, yet when used, it will be highly efficient and durable, these being essential features in any device of this class. In conclusion, I will state that although certain specific details have been shown for the attainment of probably the best results, numerous changes may be made within the scope of the invention as claimed without sacrificing the main advantages thereof.

I claim:

1. In combination, a dipper tooth having a socket whose outer end opens through the rear end of the tooth, one side wall of the socket being formed with an opening, the opposite side of said socket opening through one side of the tooth, said side of the tooth having cavities formed therein above and below and in communication with the socket, an attaching shank received in the socket, an integral projection on one side of said shank extending through the opening in the side wall of the socket, oppositely disposed wings formed integral with and projecting upwardly and downwardly from said shank, said wings being received in the aforesaid cavities in the tooth, and releasable means for normally preventing relative movement of said tooth and shank.

2. In combination, a dipper tooth having a substantially V-shaped socket whose larger end opens through the rear end of the tooth, one side of said socket opening through one side of said tooth, the opposite side of said tooth being formed with an angular opening leading into the other side of the socket, said last named side of the tooth extending rearwardly beyond the body of said tooth to form an attaching ear and said first named side of said tooth having upper and lower cavities opening into the socket, said cavities having side walls converging toward said socket, and having flat inner walls, a shank having a tapered front end received snugly in the socket, an angular projection formed integrally with one side of said front end and received snugly in said angular opening, upper and lower flat dove-tail wings formed integrally with the other side of said end and disposed in said cavities, and a bolt passing through the aforesaid attaching ear and shank.

In testimony whereof I have hereunto set my hand in presence of two subscribing witnesses.

EDWIN W. DIETZ.

Witnesses:
LOUISE SCHOENDINE,
HELENE SCHOENDINE.

Copies of this patent may be obtained for five cents each, by addressing the "Commissioner of Patents, Washington, D. C."